G. RISCHMULLER.
EXPANDING FRICTION BRAKE.
APPLICATION FILED DEC. 16, 1918.
1,316,806.
Patented Sept. 23, 1919.
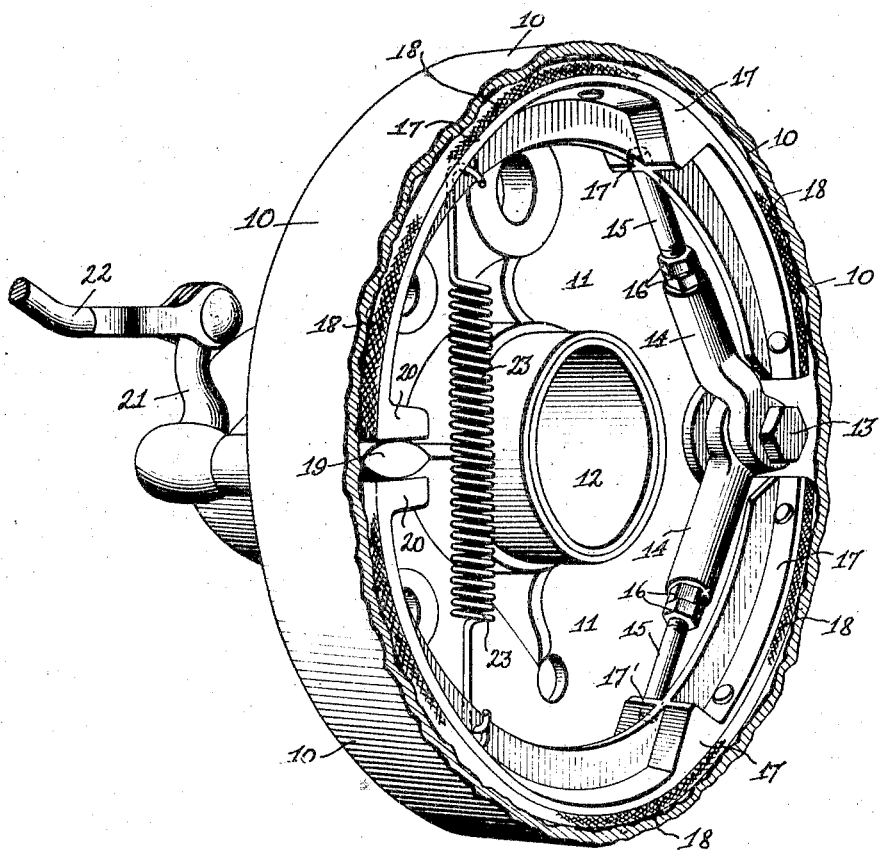
Witness
Chas. L. Griesbauer.
Inventor
George Rischmuller,
By W. Schoenborn
Attorney

UNITED STATES PATENT OFFICE.

GEORGE RISCHMULLER, OF SAN FRANCISCO, CALIFORNIA.

EXPANDING FRICTION-BRAKE.

1,316,806.  Specification of Letters Patent.  Patented Sept. 23, 1919.

Application filed December 16, 1918. Serial No. 266,973.

*To all whom it may concern:*

Be it known that I, GEORGE RISCHMULLER, a citizen of the United States, residing at San Francisco, in the county of San Francisco and State of California have invented new and useful Improvements in Expanding Friction-Brakes, of which the following is a specification.

This invention relates to circular friction brake devices particularly adapted to be used in connection with automobiles and which are made in two separate halves or sections pivotally supported from a common stud or pin and adapted to be forced apart or away from each other by a cam or like device to expand the brake surfaces or shoes against the inner surface of a drum or rim on the wheel or other driven part to apply the desired brake pressure. As the brake surfaces wear, the brake becomes more and more inefficient, and there being no means provided in said type of brake for adjusting the device to compensate for such wear and tear, the brake has to be renewed or a new one applied in its place after very little service.

The objects of my invention are to provide, in conjunction with a brake device of the type referred to, means whereby the said device can be readily adjusted from time to time to any desired extent to compensate for the wear of the braking surfaces with the use of a minimum of parts and time in making such adjustments, and so arrange the curved surfaces of the braking shoes or blocks with respect to the inner annular surface of the brake drum or rim, their point of support or reaction and the separating cam, so that the entire outer surface of the braking blocks or shoes will simultaneously and uniformly come in contact with the inner surface of the drum or rim, thereby always preserving a maximum of surface and efficiency of the coöperating braking surfaces and at the same time insuring a long life to the rubbing or braking parts due to this uniform application, distribution and wear over the entire surfaces of the braking parts at all times during the operation of the brake.

The invention consists of structural characteristics and relative arrangements of elements which will be hereinafter more fully described and particularly pointed out in the appended claims.

The drawing represents a perspective view of the invention with a section of the drum broken away.

Referring to the drawing, 10 represents the usual form of drum or rim which is fixed to and rotated with the driving wheel of an automobile or any other rotary driven element, 11 is a stationary plate fixed to the chassis of an automobile or other non-rotating element of a machine, and in case the brake is used in connection with an automobile then is provided a circular opening and bearing 12 to receive an axle to which the driving wheels, not shown, are connected and form no part of the present invention. A stud bolt or pin 13 is securely fastened by means of threads or otherwise near the periphery of the fixed plate 11, as shown, and said bolt or pin is so arranged and constructed as to engage and form a pivotal bearing for two combined adjusting and supporting links 14, 14. Each of the links 14, has an extension 15 provided with a threaded end adapted to engage a threaded socket in the ends of the links 14, whereby the distance of the outer ends of the extensions 15 from the axis of the stud bolt or pin 13, may be adjusted or carried for purposes to be presently described. Lock nuts 16, 16, engage the threads on the extensions 15, 15, for the purpose of firmly retaining the said extensions 15, in their proper adjusted position in said link sections 14, 14. Arc-shaped or curved brake shoes 17, 17, having the usual linings 18, 18, engage the inner surface of the drum or rim 10, and are so constructed and arranged as to be supported substantially at or near their middle portion of their inner sides on the outer ends of the extensions 15, 15, said outer ends fitting loosely in circular sockets or recesses in said shoes 17, as shown, whereby a fulcrum or point of reaction 17' for each of said brake shoes 17 is disposed or arranged near the center section of each of the brake shoes and also in proximity to the inner surface of the drum.

From a bearing in and near the periphery of the plate 11 and situated diametrically opposite from the stud bolt or pin 13 is supported the usual form of cam or wedge 19, arranged so as to be disposed between the separated and adjacent ends 20, 20, of the brake shoes 17, 17, and acting when operated by the usual lever 21 and rod 22 to force said adjacent ends 20, 20, apart. A single coil spring 23 has its ends connected to the brake shoes 17, 17, between the separated ends 20, 20, and the fulcrum or points of reaction 17' of said shoes, and acts to normally hold said shoes out of contact with the inner surface of the drum 10.

From the foregoing disclosure of the construction and arrangement of the several parts composing the brake, it will be understood that the links 14, 14, perform the double function of acting as supports for the brake shoes 17, 17, and at the same time enable said shoes to be readily and quickly adjusted to or from the inner surface of the drum 10 by means of screwing in or out the extensions 15, 15, and holding them firmly in their adjusted position by means of the lock nuts 16, 16. As the points of reaction or fulcrums 17' are near the center portions of the undersides of the brake shoes 17, 17, and in proximity to the inner surface of the coöperating drum 10, it will clearly be seen that when the cam or wedge 19 reacts against and separates the adjacent ends 20, 20, of the brake shoes 17, 17, the different portions of the outer surface of said shoes move uniformly and simultaneously in directions corresponding substantially to the radii of the drum 10, and hence the rubbing or friction between said outer surfaces of the brake shoes 17, and inner surface of the drum 10 is uniformly distributed over the entire surface of said shoes and drum, thereby insuring an even wear and long life to the braking surfaces, and a most reliable and maximum efficiency of braking effect is produced with a minimum use of applied force and parts in the construction of the brake.

What I claim is:

1. An expanding friction brake comprising the combination of a fixed member, a drum for connection to a rotary element and arranged adjacent to said fixed member, a pair of oppositely disposed arc-shaped brake shoes constructed and arranged to coöperate with the inner surface of said drum, a pin secured to said plate, a supporting link for each of said brake shoes having one of its ends pivotally carried by said pin and its other and free end reacting against substantially the middle portion of the inner side of the brake shoe, and means for separating the brake shoes and causing their middle portions to act against the free ends of the supporting link and force the entire outer surface of each of the brake shoes uniformly and simultaneously in contact with the inner surface of the drum.

2. An expanding friction brake comprising the combination of a fixed member, a drum for connection to a rotary element and arranged adjacent to said fixed member, a pair of oppositely disposed arc-shaped brake shoes constructed and arranged to coöperate with the inner surface of said drum, a pin secured to said plate near the inner surface of the drum and one set of separated ends of the brake shoes, a combined supporting and adjusting link for each of said brake shoes having one of its ends pivotally carried by said pin and its other and free end reacting against substantially the middle portion of the inner side of the brake shoe, means for varying the length of each supporting and adjusting link, and means for separating the other set of adjacent ends of the brake shoes on the opposite side of the drum, whereby the entire outer surface of each of the brake shoes is uniformly and simultaneously brought in contact with the inner surface of the drum.

3. An expanding friction brake comprising the combination of a fixed member, a drum for connection to a rotary element and arranged adjacent to said fixed member, a pair of oppositely disposed arc-shaped brake shoes constructed and arranged to coöperate with the inner surface of said drum, a pin secured to said plate near the inner surface of the drum and one set of separated ends of the brake shoes, a combined supporting and adjusting link for each of said brake shoes having one of its ends pivotally carried by said pins and its other and free end reacting against substantially the middle portion of the inner side of the brake shoe, means for varying the length of each supporting and adjusting link, a single spring connected to said brake shoes and normally tending to withdraw the outer surfaces of said brake shoes from contact with the inner surface of the drum, and means for separating the other set of adjacent ends of the brake shoes on the opposite side of the drum and against the action of the spring, whereby the entire outer surface of each of the brake shoes is uniformly and simultaneously brought in contact with the inner surface of the drum.

In testimony whereof I affix my signature.

GEORGE RISCHMULLER.